United States Patent Office 3,720,653
Patented Mar. 13, 1973

3,720,653
COLORED INTERPOLYMERS OF AN EPOXY COMPOUND, VINYLPYRROLIDONE AND VINYL ACETATE
Gregoire Kalopissis and Andre Viout, Paris, France, assignors to Societe Anonyme dite: L'Oreal, Paris, France
No Drawing. Continuation-in-part of application Ser. No. 549,446, May 12, 1966. This application Jan. 25, 1971, Ser. No. 109,693
Claims priority, application France, Apr. 20, 1966, 58,324; Luxembourg, May 13, 1965, 48,591
Int. Cl. C08f 15/40
U.S. Cl. 260—80.72                               4 Claims

ABSTRACT OF THE DISCLOSURE

A colored copolymer soluble in a solvent selected from the group consisting of water, alcohol and mixtures thereof consisting essentially of a first comonomer containing a reactive epoxy group and being selected from the group consisting of glycidyl methacrylate, glycidyl acrylate and allyl glycidyl ether, a second comonomer consisting of vinylpyrrolidone, the remaining comonomer being essentially vinyl acetate, and a dye selected from the group consisting of azo, anthraquinone and benzene dyes containing an extra-nuclear radical having the formula:

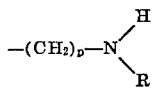

wherein R is selected from the group consisting of hydrogen, —CH$_3$ and —C$_2$H$_5$ and p is 2–6, said extra-nuclear radical being bonded to the aromatic nucleus of said dye through a nitrogen atom directly attached to said aromatic nucleus and said dye being bonded to said reactive epoxy group through the terminal nitrogen atom of said extra-nuclear radical.

SUMMARY OF THE INVENTION

This application is a continuation-in-part of application Ser. No. 549,446, filed May 12, 1966, now abandoned.

Many hair lacquers or setting lotions are presently known which comprise natural or synthetic resins in alcoholic or hydro-alcoholic solutions.
are transparent, and are intended to keep the hair in place Most of the lacquers or setting lotions heretofore used while imparting certain additional qualtiies such as sheen or lustre, without changing the color, or even the shade of the hair.

It has, however, also been suggested that hair lacquers or setting lotions be used which do affect the color of the hair to which they are applied.

It was first suggested that dyes be incorporated into the lacquers or lotions which are soluble in the solutions of resins from which they are made, but these attempts did not give satisfactory results because the dye is not adequately retained by the resin and hair treated therewith stains the skin, and any clothing coming in contact therewith.

In order to at least partially overcome this difficulty, it has been suggested that the lacquers or setting lotions be made with colored polymers which may be obtained by copolymerization of a colored monomer with colorless monomers or by chemically bonding to an already polymerized resin dyes which are capable of imparting a durable color thereto.

In particular, the applicant has already suggested the formation of colored polymers comprising amide groups, the nitrogenous part of which is formed by groups of dyes consisting of the aromatic diamines.

However, such colored polymers are not currently used to make hair lacquers or setting lotions because they have certain disadvantages.

First, in some cases, the bonding of the dye to the resin, or to the monomer which serves to form the resin, weakens or undesirably modifies the shade of the dye.

But above all, the types of colored resins which have heretofore been proposed have had inadequate cosmetic properties as compared with the very high qualities of the colorless resins already known.

It is well known that resins used in hair lacquers or lotions must have certain contradictory qualities which are difficult to reconcile.

In the first place, these resins must be soluble in water or in alcoholic medium so that they may be applied and must be easily removable by simply shampooing the hair. On the other hand, they must have an excellent resistance to humidity so as to avoid giving the hair a sticky appearance which is considered particularly unattractive.

Moreover, these resins must be sufficiently hard and transparent to impart a sheen to the hair. They must also be removable by simply brushing, but without any tendency to peel off or crumble when the hair is subjected to the bending to which a coiffeur is normally subjected.

The present invention relates to colored resins having characteristics which make it possible to prepare lacquers and setting lotions which have cosmetic properties comparable to those of the best colorless lacquers actually on the market and in which the dye is bonded to the resin without adversely affecting the shade of the dye and without changing the qualities of the supporting resin.

The present invention provided colored resins which can be used as the hair holding ingredient in hair lacquer or setting lotion compositions. These resins are essentially characterized by the fact that they consist of a polymer comprising on the one hand monomers suitable for the production of cosmetic resins and, on the other hand, at least one monomer having a reactive epoxy group to which a dye having an extra-nuclear primary or secondary amine group is chemically bound by opening of the epoxy group in the following manner:

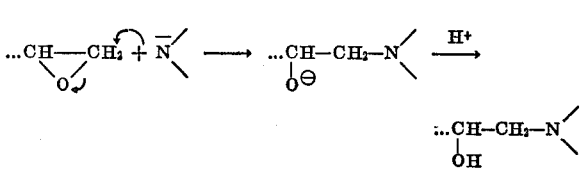

The resulting function is a β-hydroxy amino function.

The monomers comprising an epoxy group are selected from the group consisting of glycidyl methacrylate, glycidyl acrylate and allylglycidyl ether.

The monomers which may be used for obtaining cosmetic resin properties include vinylic esters such as vinyl acetate, vinyl lactams such as vinylpyrrolidone, alkyl acrylates or methacrylates, and acrylamides or methacrylamides and mixtures of said monomers.

Among the extra-nuclear amine dyes which may be used in carrying out the invention are those having the following formula:

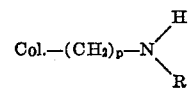

in which:
p is 2 to 6 inclusive, and

R is selected from the group consisting of hydrogen, —CH₃ and —C₂H₅.

The expression Col. represents a cyclic or polycyclic dye selected from the group consisting of azo, anthraquinone and benzene dyes which have at least one amine function which has its nitrogen atom bonded to said

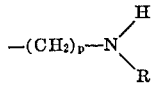

group.

These dyes may contain one or more supplementary amine functions, NO₂, alkyl having 1 to 4 carbon atoms, alkoxy of which the alkyl moiety is 1 to 4 carbon atoms and other customary substitute groups directly attached to the ring.

In order to obtain a desired shade, several colored polymers having different colors can be mixed together, or several successive dyes of different colors may be bound to the copolymer. In this case only a small proportion of the first dye is used so that sufficient epoxy groups remain on the copolymer to permit a second and even a third dye to be bound to the copolymer.

In certain cases it may be advantageous to condense a dye on the colorless copolymer in less than stoichiometric proportions so as to leave some unreacted epoxy groups which may improve the cosmetic qualities of the resin.

The properties of the colored polymers obtained are dependent on the starting monomers as well as on the proportion in which they are mixed.

The copolymers may for example contain from 2 to 30% and preferably from 5 to 20% of the monomer having the reactive epoxy group, such as glycidyl methacrylate, glycidyl acrylate, or allylglycidyl ether.

In addition to those monomers, such as vinyl acetate, which impart a tendency toward insolubility to the resin, these copolymers may contain, depending upon the properties desired, about 5 to 30% of monomers which render the resulting resin more soluble in alcohol or water, an indispensable property, particularly when it is to be used in aerosol or solution form. Vinylpyrrolidone, in the proportions indicated above, is preferably used for this purpose.

In order to prepare hair lacquers or setting lotions, these colored copolymers may be used alone or mixed with other colorless polymers such as polyvinylpyrrolidone or copolymers such as polyvinylpyrrolidone/vinyl acetate, in proportions which depend on the intensity of the color sought.

Another object of this invention is to provide a colorless polymer capable of being colored by a condensation reaction with a dye having a primary or secondary amine group, said polymer being essentially characterized by the fact that it is prepared by starting with at least one monomer having a reactive epoxy group and at least one other monomer suitable for use in preparing a cosmetic resin.

The color imparting unit of the colored copolymer may be represented by the following formula:

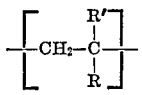

in which R' is selected from the group consisting of hydrogen atom and methyl radical, and R is selected from the group consisting of (a) 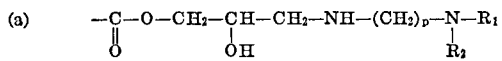

and (b) 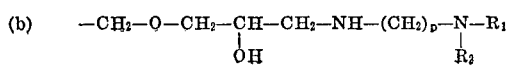

wherein R₂ is selected from the group consisting of: hydrogen atom, —CH₃ and —C₂H₅,
p is 2 to 6 inclusive, and
R₁ is a dye residue selected from the group consisting of azo, anthraquinone and benzenic dyes.

The preferred R₁ is selected from the group consisting of:

(a) 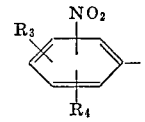

wherein R₃ is selected from the group consisting of hydrogen and

wherein R₅ represent a member selected from the group consisting of hydrogen, —CH₃ and —C₂H₅ and
R₄ represents a member selected from the group consisting of hydrogen, —OCH₃ and CH₃, (b) 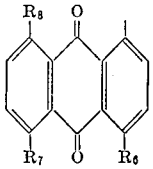

wherein R₆ represent a member selected from the group consisting of hydrogen and

wherein R₅ has the meaning given above and R₇ and R₈ are selected from the group consisting of hydrogen and —NH₂, and (c) 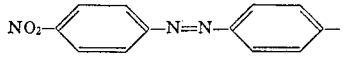

The copolymers of this invention may be prepared according to various known processes some of which are illustrated by Examples 1 to 3 set forth below. We prefer to carry out the polymerization in a solvent such as dioxane, dimethylformamide or ketones, in the presence of a catalyst such as benzoyl peroxide or azo bis-isobutyronitrile.

The condensation reaction of the epoxy group and the extra-nuclear amine group to bond the dye to the resin may be carried out by heating the dye and the colorless copolymer in a solvent such as dimethyl formamide, dioxane or the ketones. With the dye of this invention having an extra-nuclear primary or secondary amine groups, it is not necessary to employ a catalyst for the opening of the epoxy ring. The progress of the condensation reaction may be easily followed by measuring the progressive disappearance of the epoxy group. Examples 4–7 set forth below illustrate this reaction.

It is noteworthy that the reaction of the dye on the copolymers cited above in no way affects the shade of the dye reactant, or the cosmetic properties of the resulting colored resins. They are the same as those of the colorless starting resins.

Another object of this invention is to provide hair lacquers or setting lotions characterized by the fact that they contain in an alcoholic or hydroalcoholic solutions at least one color imparting copolymer of the type described above.

In order to obtain aerosol lacquers it is possible, for example, to first prepare a 2 to 20%, and preferably a 4 to 12% solution of the colored copolymer hereinbefore described, (or a mixture of this colored copolymer and another cosmetic resin) in alcohol, and then add to this solution from 2 to 3 times its own weight of a propellant which has been liquefied under pressure, such as any of the halogenated hydrocarbons sold under the trademark "Freon."

Setting lotions may be prepared by mixing into an alcoholic solution having from 20 to 50° of alcohol about 0.5 to 6%, and preferably from 1 to 3% by weight of at least one colored copolymer such as has been described, which copolymer may be mixed with other colorless cosmetic resins.

Of course, the hair lacquers and setting lotions may contain other substances customarily used for cosmetic purposes, such as plastifiers, perfumes, etc.

The hair lacquers or lotions made from these colored copolymers have the same cosmetic properties as hair lacquers or setting lotions made from colorless resins having the same composition, except for the dye bonded to the resin.

The color of the resins makes it possible for them to impart to the hair a desired shade or highlight without any deterioration in the other cosmetic properties of the resin.

Tests have unexpectedly shown that these colored copolymers do not stain the skin or clothing against which they rub after having been applied to the hair.

This surprising result is the consequence of the strong bonding between the extra-nuclear amino dye and the epoxy polymer.

Indeed with dyes having a nuclear amino function, the dye compound does not remain chemically bonded to the epoxy polymer and consequently can stain the skin or clothing.

Moreover, the colored resins according to the invention are completely and easily removed by washing or brushing, so that the hair may be given a certain particular shade or color for as short a time as may be desired.

In order that the invention may be more clearly understood several examples will now be described.

EXAMPLE 1

Preparation of a copolymer comprising 70% vinyl acetate, 25% vinylpyrrolidone and 5% glycidyl methacrylate The following monomers are introduced into a flask provided with an agitator, a condenser, a thermometer, and a tube for introducing nitrogen:

| | G. |
|---|---|
| Vinyl acetate | 140 |
| Vinylpyrrolidone | 50 |
| Glycidyl methacrylate | 10 |

300 g. of dioxane and 3 g. of azo-bis-isobutyronitrile are added, and the mixture heated to reflux for 24 hours. After cooling, the copolymer is precipitated with ether, and dried.

A 95% yield of a white powder is obtained, said powder having an epoxy index corresponding to the polymerization of 4.5% of the glycidyl methacrylate.

In the same way, a polymer having 5% glycidyl acrylate may be obtained.

EXAMPLE 2

Preparation of a copolymer comprising 70% vinyl acetate 20% vinylpyrrolidone and 10% allylglycidyl ether The following monomers are introduced into a flask provided with an agitator, a condenser, a thermometer and a tube for introducing nitrogen:

| | G. |
|---|---|
| Vinyl acetate | 140 |
| Vinylpyrrolidone | 40 |
| Allylglycidyl ether | 20 |

300 g. of dioxane, and then 3 g. of azo-bis-isobutyronitrile and 3 g. of benzoyl peroxide are added.

The mixture is heated to reflux for 16 hours. After cooling the copolymer is precipitated, using ethyl ether, and dried.

A 91% yield of white powder is obtained, which has an epoxy index corresponding to the polymerization of 7.5% of the allylglycidyl ether.

EXAMPLE 3

Preparation of a copolymer comprising 70% vinyl acetate, 25% vinylpyrrolidone and 5% allylglycidyl ether The procedure is the same as in Example 1, except that the glycidylmethacrylate is replaced by allylglycidyl ether.

The result is a 95% yield of a colorless copolymer having an epoxy index corresponding to the polymerization of 3.8% of the allylglycidyl ether.

EXAMPLE 4

Preparation of a colored copolymer by condensing the epoxy group of the copolymer described in Example 3 with the anthraquinone dye having the formula:

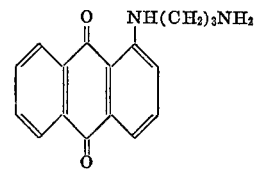

30 g. of the copolymer described in Example 3 and 170 g. of dioxane are introduced into a flask provided with an agitator, a condenser, a thermometer, and a tube for introducing nitrogen. After dissolving, 2.8 g. of the above dye, which corresponds to 1 mol of dye for each mol of epoxy, is added.

The mixture is heated to reflux for 15 hours. After the reaction, the copolymer is precipitated, using ethyl ether, and dried.

A yield of 85% by weight of a cerise red powder is obtained, which is soluble in alcohol and in a hydroalcoholic mixture.

Analyses have shown that 76% of the theoretically possible quantity of the dye is combined.

EXAMPLE 5

Preparation of a colored copolymer by reacting the epoxy group of the copolymer described in Example 2 with the dye having the formula:

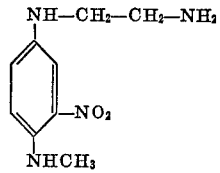

60 g. of the copolymer described in Example 2 and 140 g. of dioxane are introduced into a flask provided with an agitator, a condenser, a thermometer and a tube for introducing nitrogen. After the copolymer has completely dissolved, 8.28 g. of the above dye, which amounts to 1 mol of dye per mol of epoxy, is added, while stirring.

The mixture is heated to reflux for 18 hours. After the reaction, the copolymer is precipitated, using ethyl ether, and dried.

The result is a yield of 84% by weight of a violet powder which is soluble in alcohol and in a hydroalcoholic mixture.

Analyses have shown that 83% of the theoretically possible quantity of the dye is combined.

EXAMPLE 6

Preparation of a colored copolymer by condensing the epoxy group of the copolymer described in Example 2 with a dye having the formula:

$$\text{H}_2\text{N-C}_6\text{H}_2(\text{NH-CH}_2\text{-CH}_2\text{-NH}_2)(\text{NO}_2)(\text{CH}_3)$$

30 g. of the copolymer described in Example 2 and 70 g. of dioxane are introduced into a flask provided with an agitator, a condenser, a thermometer and a tube for introducing nitrogen. After this has dissolved, 4.14 g. of the above dye, which corresponds to 1 mol of dye per mol of epoxy, is added, while stirring.

The mixture is heated to reflux for 18 hours. At the end of the reaction the copolymer is precipitated, using ethyl ether, and dried.

The result is a yield of 87% by weight of a yellow powder which is soluble in alcohol and in a mixture of water and alcohol.

Analyses have shown that 90% of the theoretically possible quantity of dye is combined.

EXAMPLE 7

Preparation of a colored copolymer by condensing the epoxy group of the copolymer described in Example 2 with a dye having the formula:

$$\text{C}_6\text{H}_2(\text{OCH}_3)(\text{NO}_3)(\text{NH-CH}_2\text{-CH}_2\text{-NH}_2)$$

18.5 g. of the copolymer described in Example 2 and 49 g. of dioxane are introduced into a flask provided with an agitator, a condenser, a thermometer, and a tube for introducing nitrogen. After dissolving, 2.56 g. of the above dye, which corresponds to 1 mol of dye per mol of epoxy, is added, while stirring.

This is heated to reflux for 18 hours. After the reaction the copolymer is precipitated, using ethyl ether and then dried.

The result is a yield of 85% by weight of a yellow-orange powder which is soluble in alcohol and in a hydroalcoholic mixture.

Analyses have shown that 88% of the theoretically possible quantity of the dye is combined.

APPLICATIONS

Example A

A setting lotion was made by preparing the following solution:

| | |
|---|---|
| Copolymer obtained as set forth in Example 5 ___g__ | 2 |
| Ethyl alcohol _____ml__ | 50 |
| Water, q.s.p. _____ml__ | 100 |

This lotion is applied to brown hair after shampooing. The hair is then set in the usual manner.

After drying the hair has a violine mahogany shade.

Example B

In order to make a colored aerosol lacquer, the following solution was prepared:

| | G. |
|---|---|
| Copolymer obtained as in Example 5 _____ | 1 |
| Copolymer obtained as in Example 7 _____ | 1.7 |
| Polyvinylpyrrolidone (PVP) MW 40000, K value=30 _____ | 5 |
| Absolute alcohol, q.s.p. _____ | 100 |

30 g. of this solution was introduced into an aerosol bomb with 43.8 g. of trichloromonofluoromethane, the product sold under the trademark "Freon 11," and 26.1 g. of dichlorodifluoromethane, the product sold under the trademark "Freon 12."

When sprayed onto the hair the result is a mahogany lacquer which does not rub off on clothing or pillows. It is easily removed by brushing and shampooing.

Example C

In order to make a colored aerosol lacquer, the following solution was prepared:

| | G. |
|---|---|
| Copolymer obtained as in Example 4 _____ | 0.05 |
| Copolymer obtained as in Example 7 _____ | 0.1 |
| Vinyl acetate/vinylpyrrolidone copolymer (sold under the trade name "E 735," K value (1% ethanol)=30–50 _____ | 5 |
| Alcohol, q.s.p. _____ | 100 |

30 g. of this solution was mixed in an aerosol bomb with 43.8 g. of "Freon 11" and 26.1 g. of "Freon 12."

When sprayed onto the hair it produced a golden lacquer highlight effect particularly suitable for use on chestnut hair, which does not rub off on clothing or pillows. It may be removed by brushing.

Other illustrative extra-nuclear amine dyes which may be reacted with the colorless resins to produce the improved colored resins of this invention include:

$$\text{C}_6\text{H}_3(\text{NH-CH}_2\text{-CH}_2\text{-NH}_2)(\text{NO}_2)$$

$$\text{C}_6\text{H}_2(\text{NH-CH}_2\text{-CH}_2\text{-NH}_2)(\text{NH}_2)(\text{NO}_2)$$

$$\text{C}_6\text{H}_2(\text{NH-CH}_2\text{-CH}_2\text{-NH}_2)(\text{NO}_2)(\text{NH}_2)$$

Anthraquinone with $\text{NH-CH}_3$ and $\text{NH-(CH}_2\text{)}_3\text{-NH}_2$ substituents $$\text{C}_6\text{H}_3(\text{N(CH}_3)\text{-CH}_2\text{-CH}_2\text{-NH}_2)(\text{NO}_2)(\text{NH-CH}_3)$$

$$\text{O}_2\text{N-C}_6\text{H}_4\text{-N=N-C}_6\text{H}_4\text{-N(C}_2\text{H}_5)(\text{CH}_2\text{-CH}_2\text{-NH}_2)$$

Anthraquinone with $\text{NH}_2$, $\text{NH-(CH}_2\text{)}_3\text{-NH}_2$, and $\text{NH}_2$ substituents It will be appreciated that the scope of the invention is not limited to the details of the examples which have been given and that they may be suitably modified without thereby departing from the basic principles of the invention.

What is claimed is:

1. A colored copolymer soluble in a solvent selected from the group consisting of water, alcohol and mixtures thereof consisting essentially of 2 to 30% by weight of a first comonomer containing a reactive epoxy group and being selected from the group consisting of glycidyl methacrylate, glycidyl acrylate and allyl glycidyl ether, 5 to 30% by weight of a second comonomer consisting of vinylpyrrolidone, the remaining comonomer being essentially vinyl acetate and a dye selected from the group consisting of azo, anthraquinone and benzene dyes containing an extra-nuclear radical having the formula:

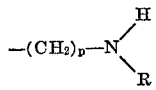

wherein R is selected from the group consisting of hydrogen, —CH$_3$ and —C$_2$H$_5$ and p is 2–6, said extra nuclear radical being bonded to the aromatic nucleus of said dye through a nitrogen atom directly attached to said aromatic nucleus and said dye being bonded in a range between 76% to 90% of the theoretically possible quantity to said first comonomer through a β-hydroxyamino function, resulting from the reaction between said reactive epoxy group and the terminal nitrogen atom of said extra nuclear radical.

2. The colored copolymer of claim 1 in which the color imparting unit of the copolymer, resulting from the reaction between the dye containing the terminal nitrogen atom and the comonomer containing the reactive epoxy group, has the following formula:

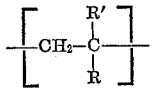

in which R' is selected from the group consisting of hydrogen and methyl, and

R is selected from the group consisting of:

(a)  —C—O—CH$_2$—CH—CH$_2$—NH—(CH$_2$)$_p$—N—R$_1$
     ‖              |                   |
     O              OH                  R$_2$ and (b)  —CH$_2$—O—CH$_2$—CH—CH$_2$—NH—(CH$_2$)$_p$—N—R$_1$
                   |                   |
                   OH                  R$_2$ wherein R$_2$ is selected from the group consisting of hydrogen, —CH$_3$ and —C$_2$H$_5$, p is 2 to 6 inclusive, and R$_1$ is selected from the group consisting of:

(a) 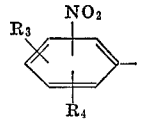

wherein R$_3$ is selected from the group consisting of hydrogen, —NH$_2$ and —NH—CH$_3$, and R$_4$ represents a member selected from the group consisting of hydrogen, —OCH$_3$ and CH$_3$, (b) 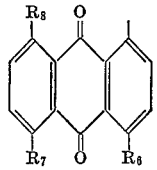

wherein R$_6$ represents a member selected from the group consisting of hydrogen and —NH—CH$_3$, and both R$_7$ and R$_8$ are selected from the group consisting of hydrogen and —NH$_2$, and (c) 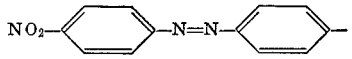

3. The colored copolymer of claim 1, which contains epoxy groups which are not combined with the dye.

4. The colored copolymer of claim 1, in which the proportion of the first comonomer containing the reactive epoxy group is from 5 to 20% by weight.

References Cited
UNITED STATES PATENTS

| | | | |
|---|---|---|---|
| 3,135,720 | 6/1964 | Batzer et al. | 260—80.5 |
| 3,251,743 | 5/1966 | Hahn et al. | 167—88 |
| 3,344,098 | 9/1967 | Horiguchi et al. | 260—22 |
| 3,364,186 | 1/1968 | Wilhelm et al. | 260—80.72 |
| 3,617,165 | 11/1971 | Kalopissis | 8—10.1 |
| 3,619,101 | 11/1971 | Kalopissis | 8—10.1 |

JAMES A. SEIDLECK, Primary Examiner

S. M. LEVIN, Assistant Examiner

U.S. Cl. X.R.

8—10.1; 260—29.6 T, 33.4 R, 33.8, 41, 895; 424—47, 71

UNITED STATES PATENT OFFICE
CERTIFICATE OF CORRECTION

Patent No. 3,720,653  Dated March 13, 1973

Inventor(s) Gregoire Kalopissis and Andre Viout

It is certified that error appears in the above-identified patent and that said Letters Patent are hereby corrected as shown below:

Foreign Application Priority Data

[30]  May 13, 1965    Luxembourg........... 48592

April 20, 1966   France...............58324

Signed and sealed this 12th day of February 1974.

(SEAL)
Attest:

EDWARD M. FLETCHER, JR.　　　　C. MARSHALL DANN
Attesting Officer　　　　　　　 Commissioner of Patents